(12) United States Patent  
Donahue et al.

(10) Patent No.: US 8,176,652 B2  
(45) Date of Patent: May 15, 2012

(54) METHOD AND APPARATUS FOR REMOVING WATER FROM HIDE OF CATTLE

(75) Inventors: Thomas R. Donahue, Sioux City, IA (US); John L. Quinlain, Sioux City, IA (US)

(73) Assignee: Tyson Foods, Inc., Springdale, AR (US)

( * ) Notice: Subject to any disclaimer, the term of this patent is extended or adjusted under 35 U.S.C. 154(b) by 575 days.

(21) Appl. No.: 12/436,410

(22) Filed: May 6, 2009

(65) Prior Publication Data

US 2010/0281708 A1 Nov. 11, 2010

(51) Int. Cl.
*F26B 5/14* (2006.01)
*B43L 17/08* (2006.01)
*A01K 29/00* (2006.01)
(52) U.S. Cl. ............. 34/399; 34/95.3; 34/397; 119/663
(58) Field of Classification Search ............... 34/95.3, 34/353, 399, 397, 398, 400; 38/45, 46, 76; 193/35 B, 35 F, 37; 280/124.11; 294/86.4; 901/28, 10; 110/104; 119/53, 652, 663, 119/731, 734, 814, 843; 452/67, 130, 173, 452/125

See application file for complete search history.

(56) References Cited

U.S. PATENT DOCUMENTS

| | | | |
|---|---|---|---|
| 3,949,709 A | 4/1976 | Myers | |
| 4,280,345 A | 7/1981 | Gimelfarb et al. | |
| 4,334,504 A | 6/1982 | Matthews | |
| 5,063,880 A | 11/1991 | Bouthillier | |
| 5,630,379 A | 5/1997 | Gerk | |
| 5,758,603 A | 6/1998 | Vivier | |
| 5,785,489 A * | 7/1998 | Perego | 414/795.8 |
| 6,029,610 A | 2/2000 | Ramsey | |

FOREIGN PATENT DOCUMENTS

AU 2006202260 A1 12/2006

* cited by examiner

*Primary Examiner* — Kenneth Rinehart  
*Assistant Examiner* — John McCormack  
(74) *Attorney, Agent, or Firm* — Mark E. Stallion, Esq.; Husch Blackwell LLP

(57) ABSTRACT

An apparatus and method for a water removing roller device for removing excess water from the hide of a cattle, which uses pliable urethane roller stacks that can be attached by an arm structure. The roller structure can be mounted on a hinge to an arm thereby allowing the structure to swivel. The arm can be attached to a stationery device with a hinge, which is also allowed to swivel. A tension device, for example, a spring or a hydraulic cylinder can be attached to the back of the arm and connected to the stationery device to provide enough tension on the structure to keep the rollers in contact with the cattle hide, thereby pressing out the water allowing it to run off prior the blood plasma saving section.

24 Claims, 17 Drawing Sheets

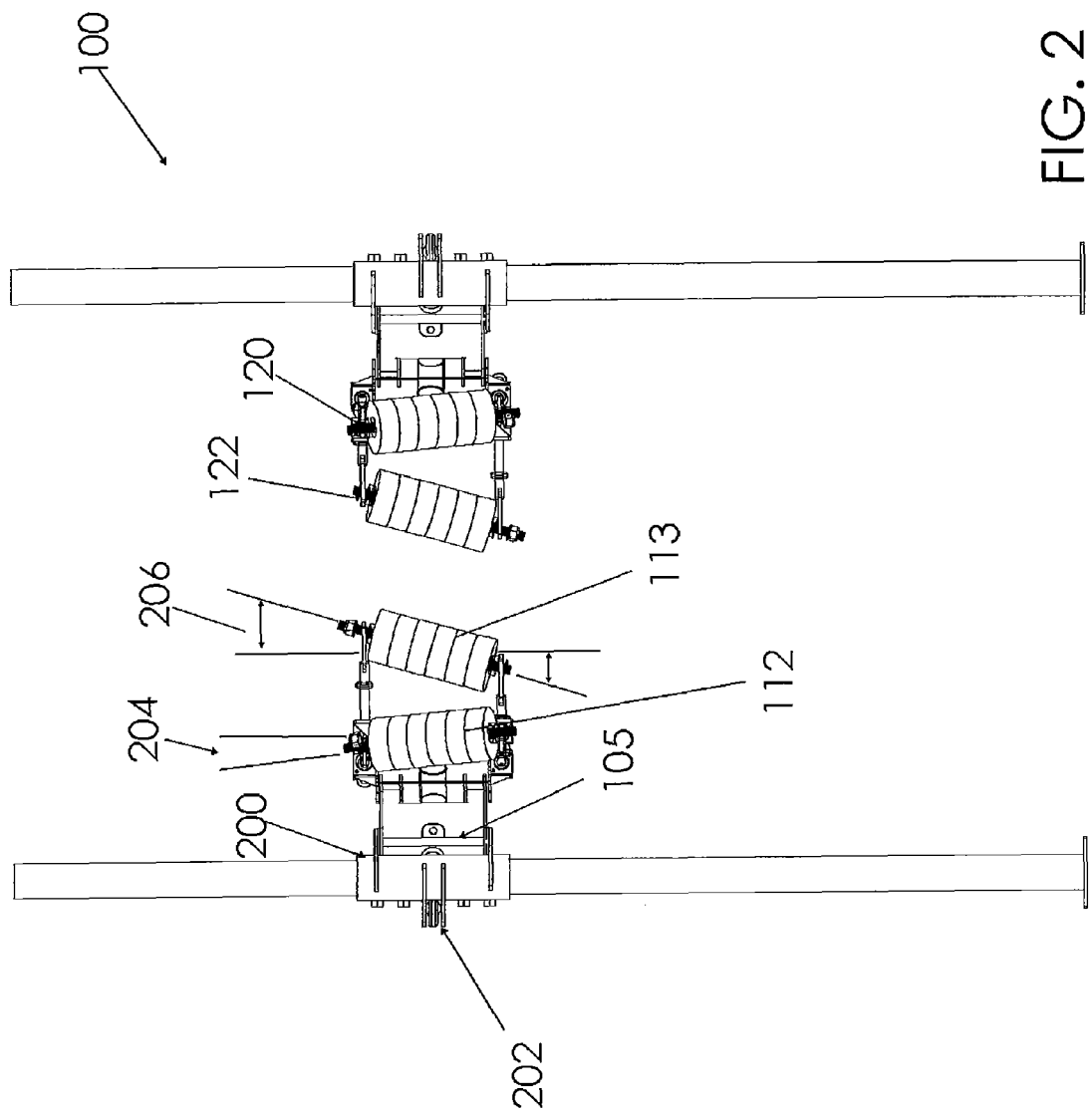

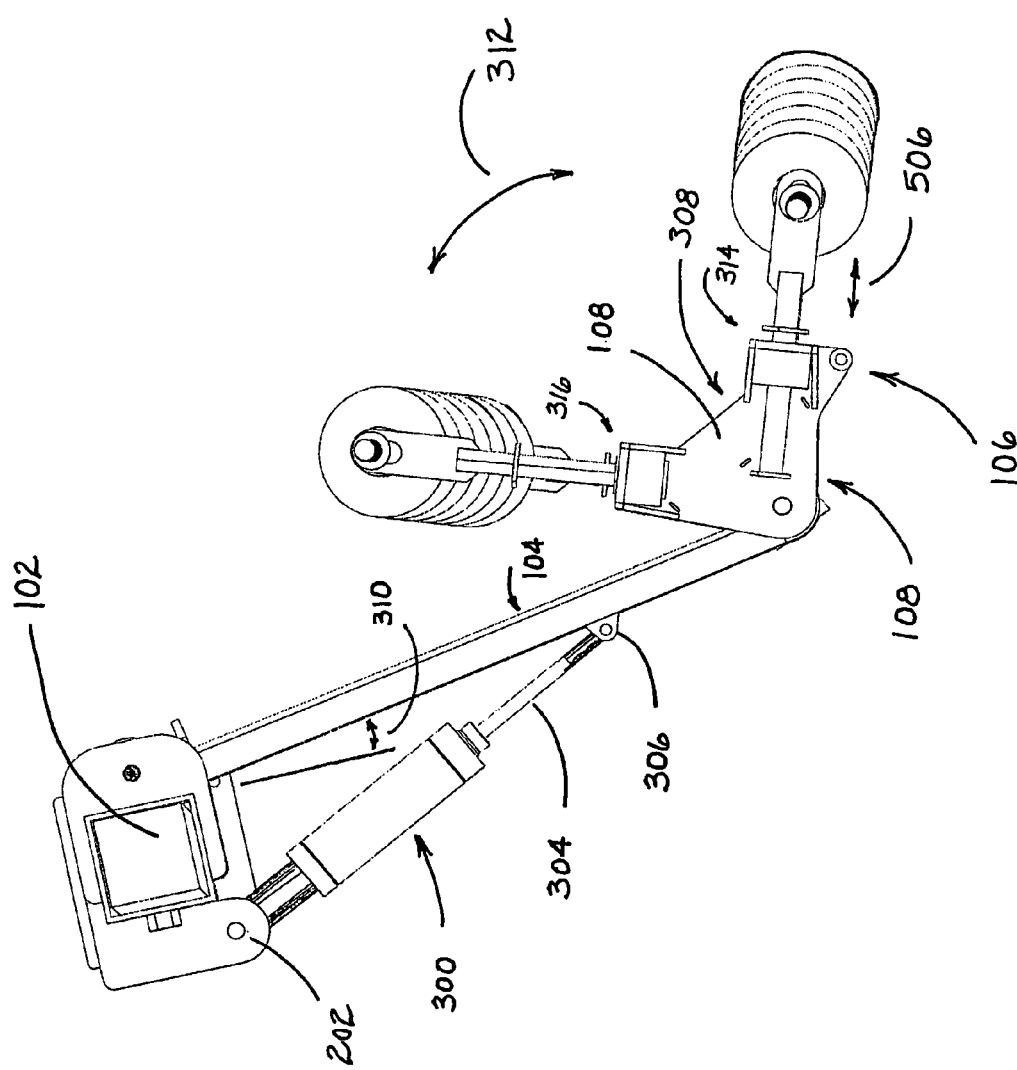

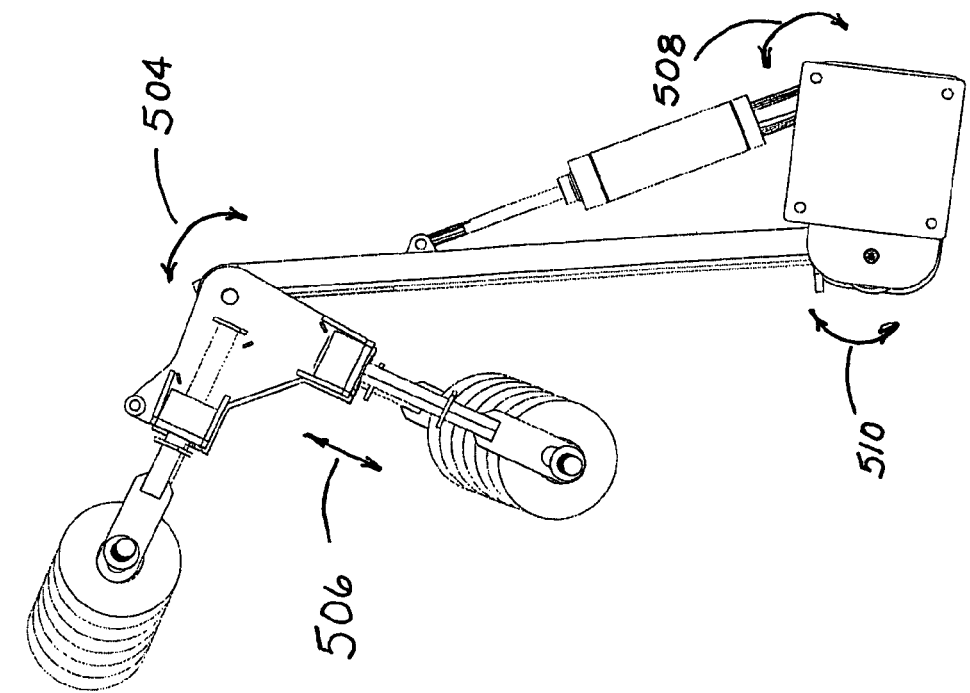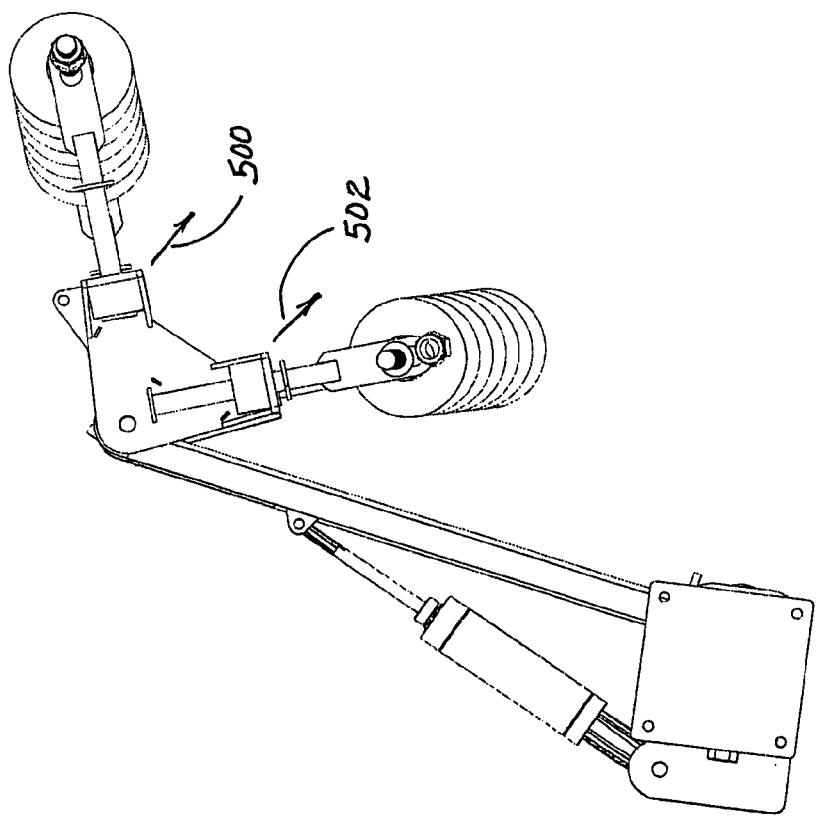
Fig. 5

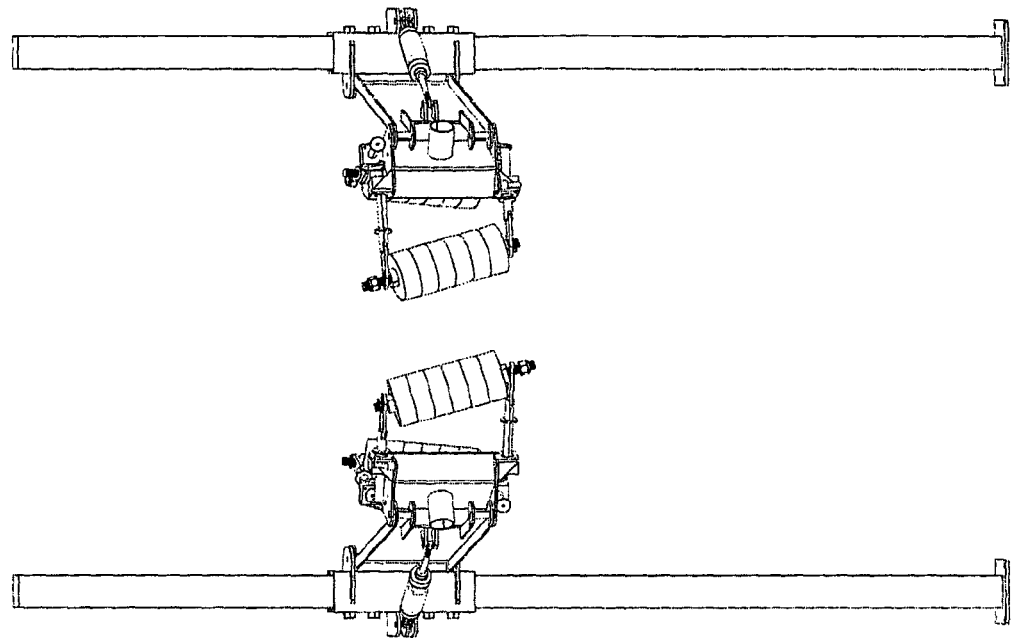
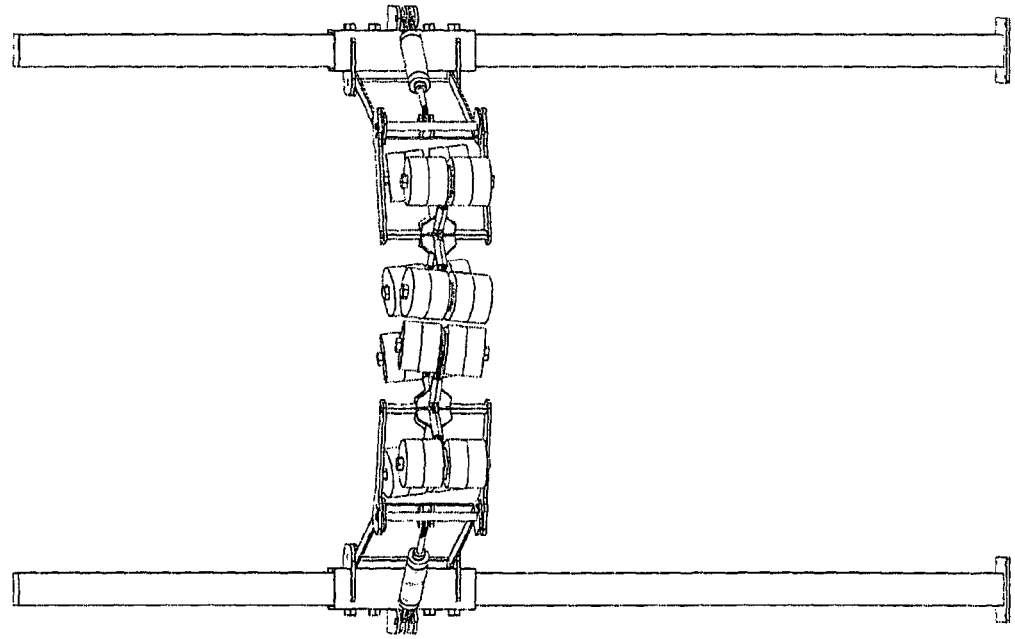
Fig. 13

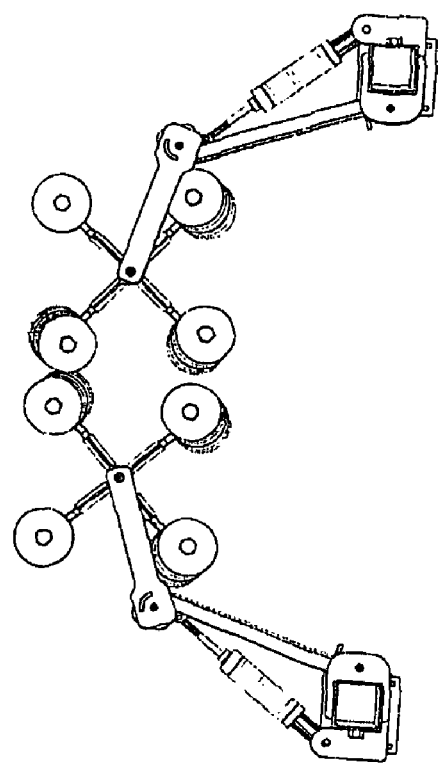
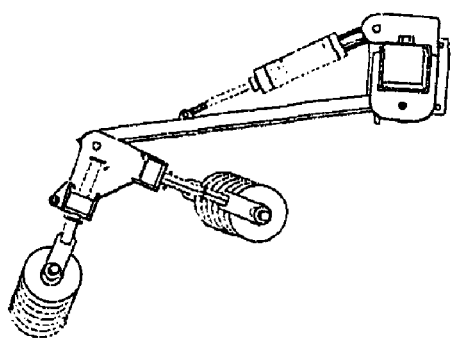
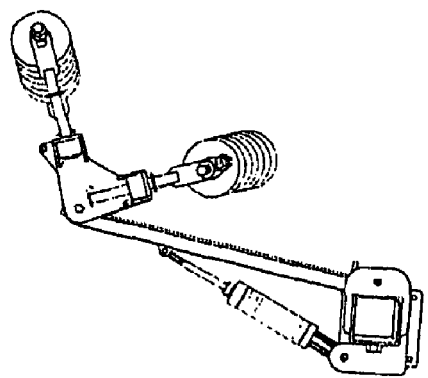
Fig. 14

METHOD AND APPARATUS FOR REMOVING WATER FROM HIDE OF CATTLE

BACKGROUND OF INVENTION

1. Field of Invention

This invention relates generally to processing cattle or other livestock animals during the slaughter process and, more particularly, to washing/rinsing the hide of an animal and removing water from the hide.

2. Background Art

In a meat processing plant, an animal's exterior hide is usually cleaned before the hide is removed, because it is typical for contaminants present on the exterior of the hide to be transferred to the meat of the animal during the hide removal process. As an alternative, the hide of the cattle can simply be wetted to remove loose contaminants or particles from the hide. This transfer can typically occur when knife cuts are made into the hide. Cleaning or wetting animals in meat processing plants can be challenging, but it is necessary because animals typically arrive at a meat processing plant with at least some contamination on their exterior. Contamination can often be worst around the animal's anal region, but can exist anywhere on the hide. Cattle and other livestock have been traditionally washed or wetted at abattoirs/slaughter houses, prior to slaughter, by either hosing them down with a high pressure water hose, or by allowing the animals, particularly so in the case of sheep, to pass through a swim bath. Using a high pressure spray separately or in combination with a bath may result in the spread of contamination present on a hide or the swim wash/wetting used on its own may also provide a breeding ground for contamination. The animals may superficially appear to be clean, but in fact may pick up contamination from the spray off another animal or from the bath, which may in turn contaminate the meat.

Animals when processed are typically suspended from their hind legs, thus contamination from the anal regions can easily be spread from there to other parts of the animal's exterior. Therefore, animals are typically cleaned or wetted while they are alive and on their own feet. The cleaning often involves baths or spray washes and it is usually necessary to allow the animals to at least partially dry before further processing.

However, while they are still alive, the animals can still defecate and can contaminate one another, and since their bodies are warm any residual water or moisture on the animal's body can simply help to stimulate the re-growth of large populations of microbial contaminants. The methods typically employed involved the use of manual steps. If water is used in the cleaning or wetting operation, it is difficult for a single operator to apply sufficient water and to control where the water goes. Water that is allowed to drain from one region of the hide to another can result in contamination to other parts of the animal's hide and therefore this draining action must be minimized. Also, water that sprays off an animal as it is being cleaned can contaminate other animals on the chain.

Yet another problem with water draining from the hide of cattle is the water can also contaminate and/or reduce the quality of the blood plasma rendered from the slaughtered cattle by dripping and intermingling with the plasma such that the plasma is no longer fit for subsequent use. If water is still dripping during the Plasma Saving section of the slaughter process, water can inadvertently drip into the bleed pan, thereby affecting the blood plasma by rupturing the red blood cells in the raw blood thereby not allowing for a quality plasma to be produced. Previous efforts for removing excess water, thereby reducing water run off, have not been effective enough to reduce the water drainage by a significant enough level such that a quality plasma can be produced. Previous solutions have been to wet the cattle after the Plasma Saving section or to allow enough drip time to occur before the cattle reach the Plasma Saving section. This methodology is a disruption to the natural flow of the conveyance line and could require significant modifications to the kill floor layout where there is not enough drip time to allow for excess water run off. In facilities where the animals are bled before the cattle wetter, there is often a lower blood yield and higher protein loadings sent to the wastewater treatment facility. After the initial bleed time, there is still a significant amount of blood that will drip from the wound. This blood has value if it can be successfully processed and will result in increased cost if it is sent to the wastewater treatment facility.

The spread of contaminants into the air can also result when spraying an already wet animal resulting in the spread of contaminants throughout the immediate area. Therefore, it can be necessary to contain the cleaning or wetting within an isolated compartment to prevent the spread of contaminants to other parts of the production line or between animals. It is crucial that contaminants are not allowed to spread from one animal to another. Various drying techniques have been attempted, which follow quickly behind any water washing or wetting activities. The effectiveness of the drying technique can effect the spread of contaminants. Vacuum nozzles as well as blower nozzles have been attempted.

It is desirable to clean or wet the pelt in such a way that it is not damaged, and it is also particularly desirable that dirt is removed from the pelt in at least those areas where incisions will be made by the slaughter men, in order to minimize the risk of contamination of the meat either by cutting through a dirty pelt, or when the carcass is being opened up, a dirty portion of the pelt falling back on to the meat, giving rise to the possibility of contamination if dirt or bacteria in contact with the open carcass.

BRIEF SUMMARY OF INVENTION

The invention is a system and method to assist in the removal of water from the hides of cattle meant for slaughter after the hides have been cleaned or wetted The present invention can be utilized to remove extra water that could potentially negatively impact plasma production. One embodiment of the present invention can be a water removing roller device, which uses pliable urethane dual roller stacks that can be attached by a V-Shaped or V-configured structure.

The roller stacks can each include multiple rollers vertically stacked one atop the other. Multiple stacked individual smaller rollers can be more effective than a single solid elongated roller because the spaces between each of the stacked rollers can have a wicking effect for channeling water away from the hide and through the spaces. The V-shaped (or two extension member structure) roller structure (roller stack assembly) can be pivotally mounted on to an arm thereby allowing the structure to swivel or pivot about the mount. The arm can be attached to a stationery device or support member with a hinge or pivot mount, which is also allowed to swivel. A tension device, for example, a spring or a hydraulic cylinder or other type of actuation cylinder can be attached to the back of the arm and connected to the stationery device to provide enough tension on the roller stack assembly structure to keep the rollers in contact with the cattle hide, thereby pressing out the water allowing it to run off prior the blood plasma saving section.

Another embodiment of the present invention can be a water removing roller device, which uses four pliable urethane roller stacks attached to outer ends of the appendages or branches of a cross structure. The quad stack roller structure can be mounted on a hinged arm in a manner that allows the structure to swivel. The arm can be attached to a stationery device with a hinge, which is also allowed to swivel. A tension device, for example, a spring or a hydraulic cylinder or other actuation cylinder can be attached to the back of the arm and connected to the stationery device to provide enough tension on the structure to keep the rollers in contact with the cattle hide, thereby pressing out the water allowing it to run off prior the blood plasma saving section.

Yet another embodiment of the present invention can be the use of one or more dual roller stack assemblies in combination with one or more four (or quad) roller stack assemblies arranged in line one with respect to the other and both adjacent a line of conveyance along which animal carcasses are being conveyed. The embodiment can also include a combination of single roller stack assemblies or multiple roller stack assemblies having two or more roller stacks.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 2 is an illustrative front plan view of a two roller stack water removal assembly configuration;

FIG. 3 is an illustrative top view of a two roller stack water removal assembly;

FIG. 5 is an illustrative bottom view of a two roller stack water removal assembly configuration;

FIG. 13 is an illustrative rear view of a two roller stack and four roller stack water removal assembly; and FIG. 14 is an illustrative top view of a two roller stack and four roller stack water removal assembly.

Figure 1:
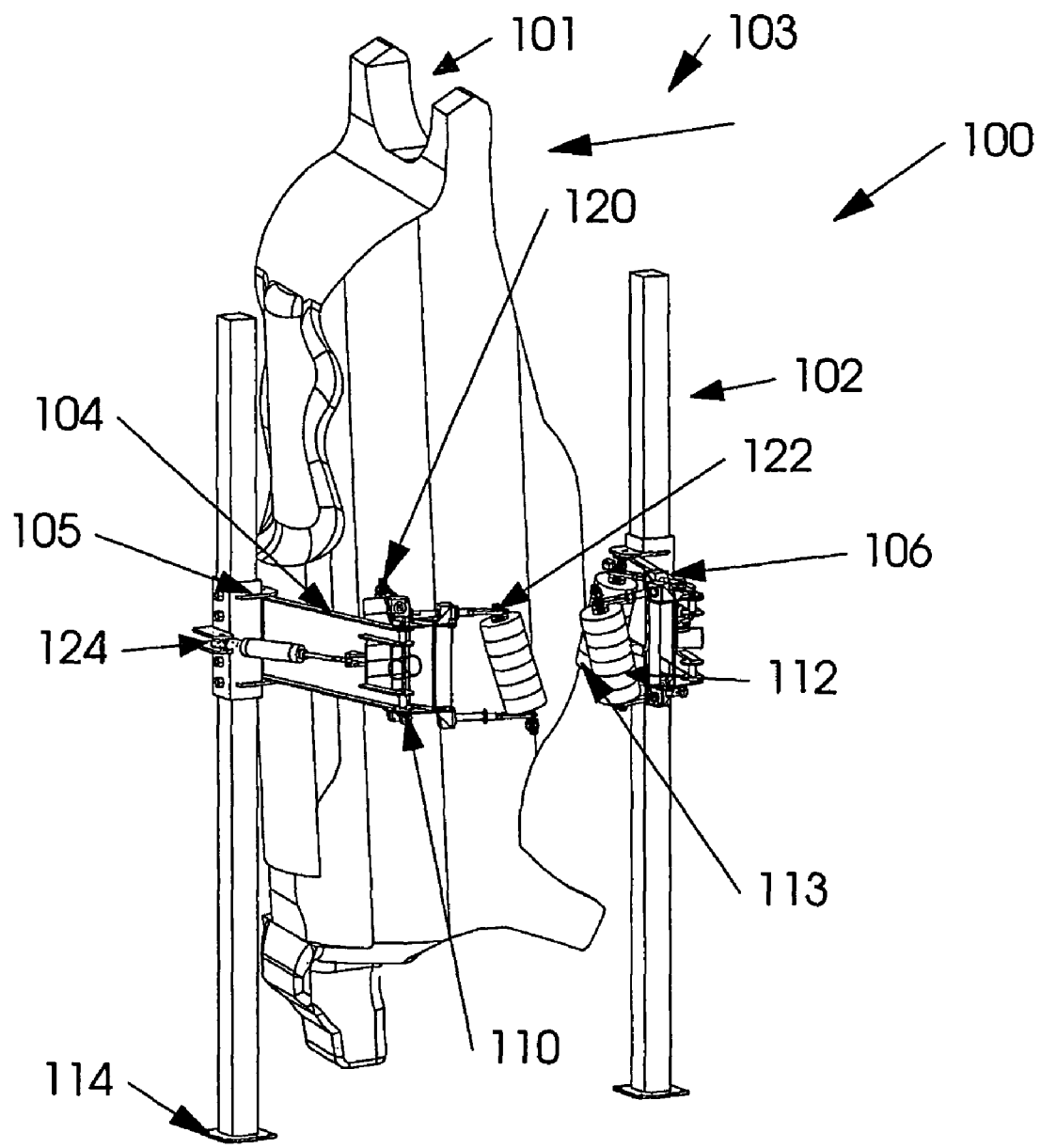
FIG. 1 is an illustrative perspective view of a two roller stack water removal assembly configuration adjacent a line of conveyance.
Figure 1A:
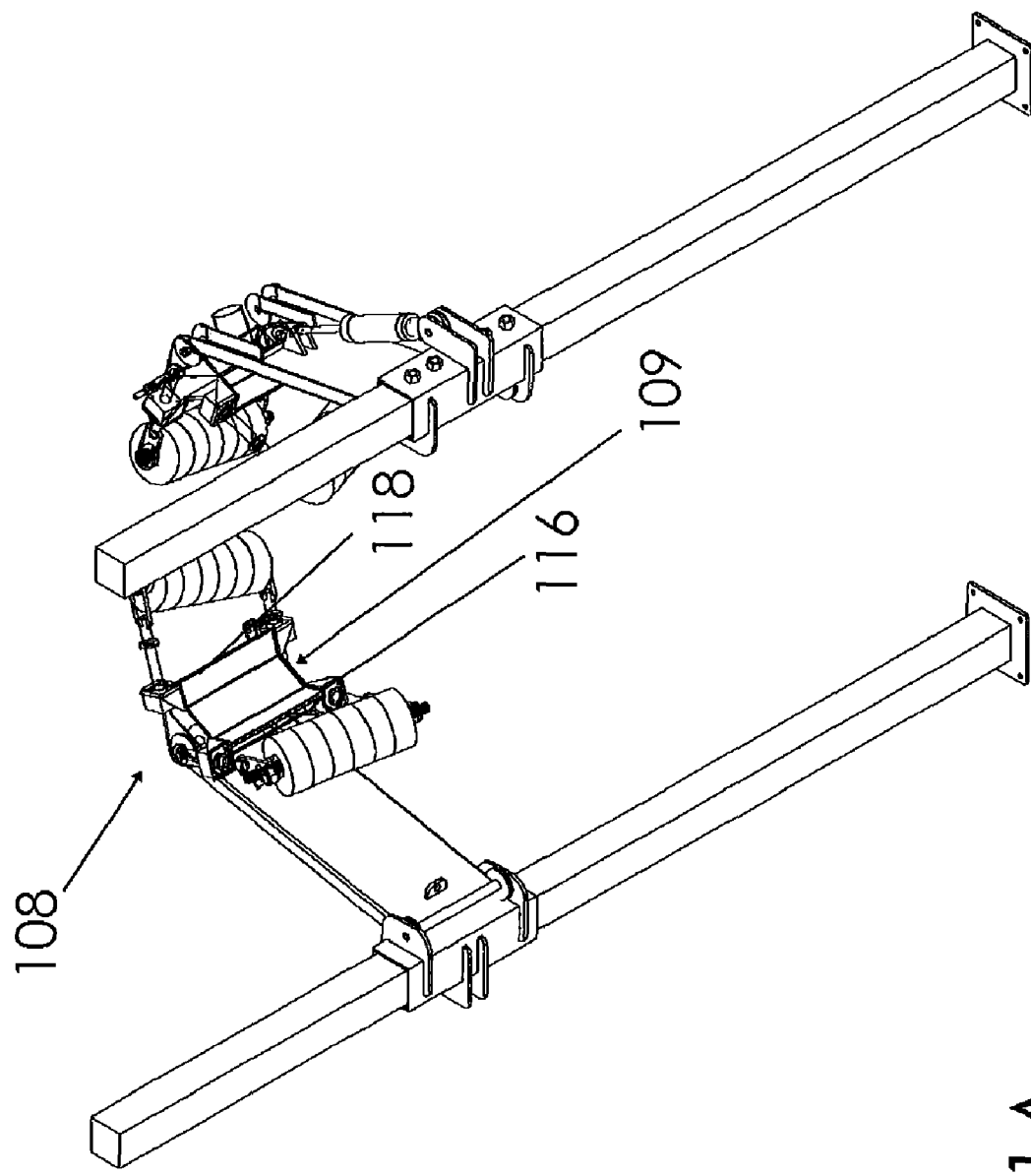
FIG. 1A is an illustrative perspective view of a two roller stack water removal assembly configuration.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-14 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising roller stacks attached to an arm structure and a related method teaches a novel apparatus and method for removing excess water from a hide of an animal. A plurality of rollers can be rotatably mounted about a proximately vertical oriented roller axle and vertically stacked one atop another forming a roller stack can be provided as illustrated in FIG. 2 and alternatively in FIG. 8. The proximately vertical oriented roller axle can be between 0 degrees to about approximately 20 degrees off vertical. Alternatively, the orientation can be absolutely vertical. The roller stack can be retained from above and below on said roller axle between an upper and lower retention bracket respectively forming a roller stack assembly. The upper and lower retention brackets can be pivotally mounted on a common roller stack assembly pivot about which the roller stack assembly can rotate. The roller stack assembly pivot can be mounted on an engaging end of a substantially horizontally extending support arm where a distal end of said support arm is pivotally mounted on a vertically oriented support arm pivot about which the support arm rotates and where said support arm pivot is mounted to a support member. The substantially horizontal orientation of the support arm can be absolutely horizontal or alternatively proximately horizontal between 0 degrees to about approximately 20 degrees off horizontal. An actuation cylinder can have an actuation shaft attached to the support arm where the actuation cylinder actuates the actuation shaft to extend out and retract causing the pivot arm to rotate about a pivot to an engaging position and a disengaging position of the roller stack assembly.

Figure 7:
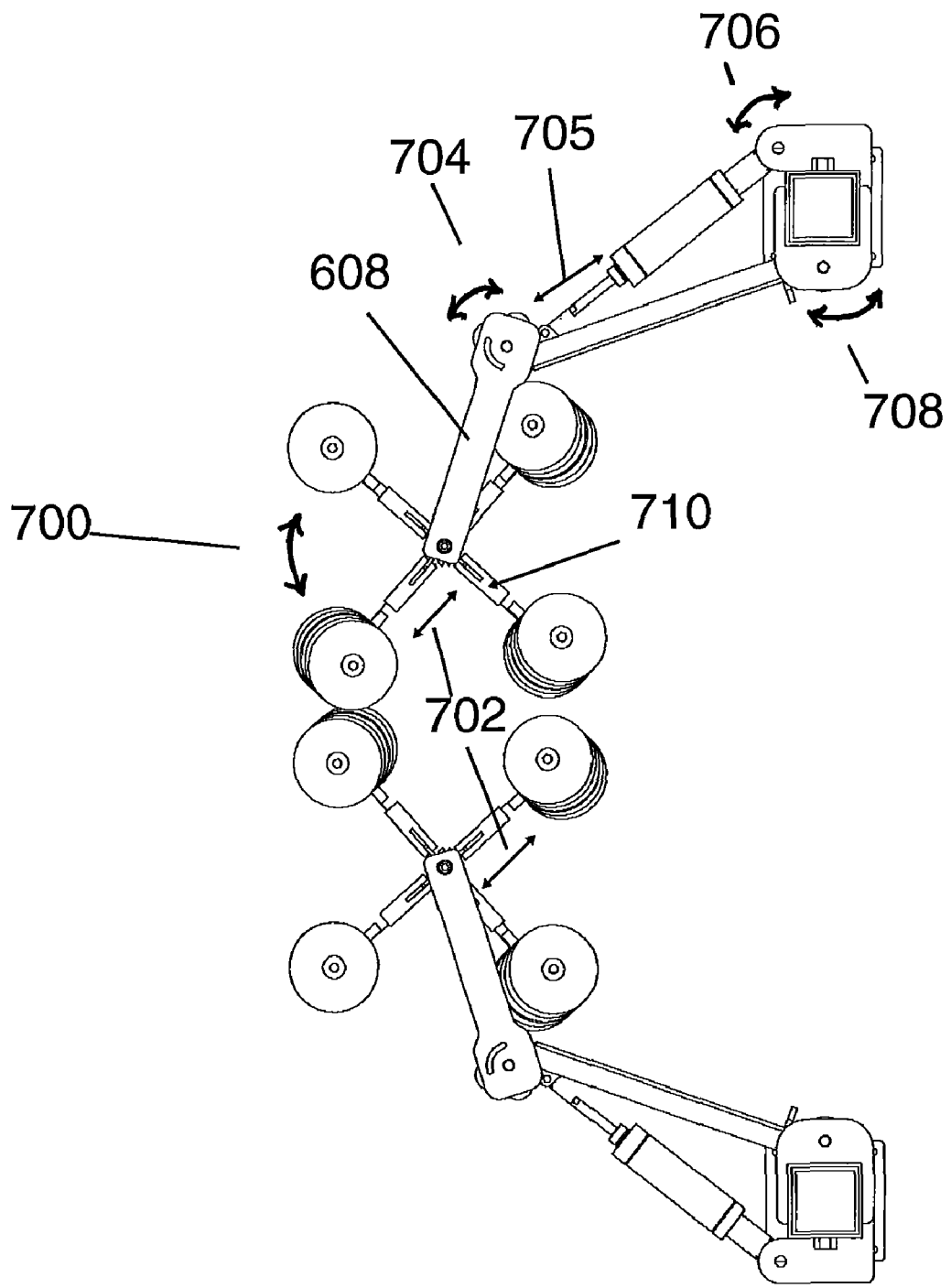
FIG. 7 is an illustrative top plan view of an alternative embodiment four roller stack water removal assembly.
Figure 8:
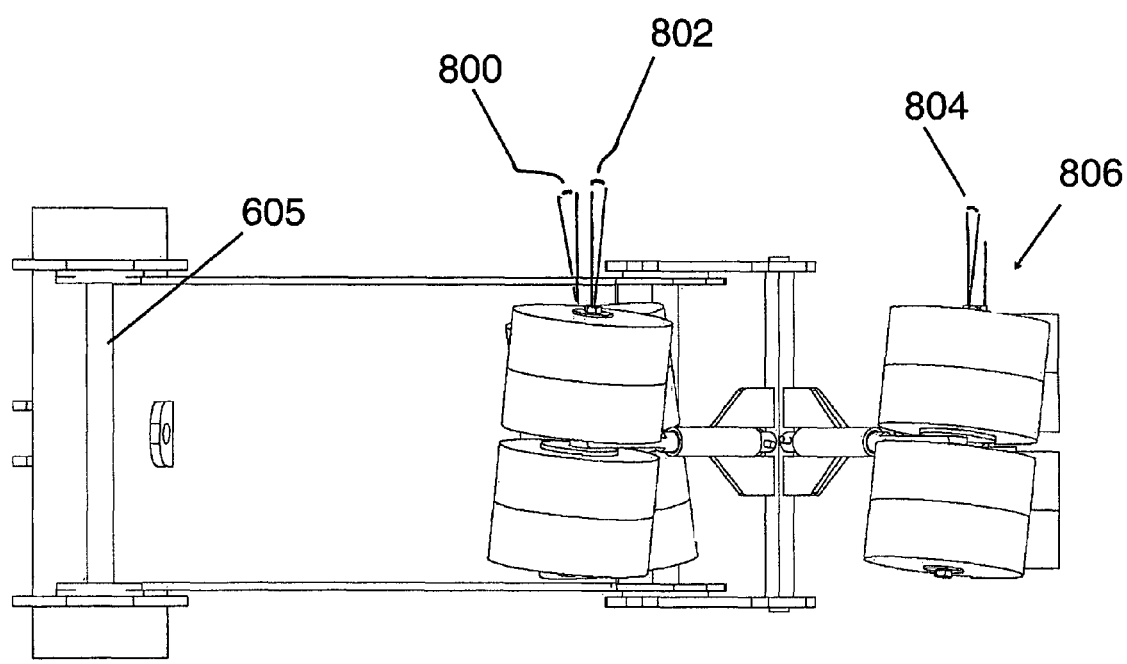
FIG. 8 is an illustration of a front plan view of an alternative embodiment four roller stack assembly.

The roller stack assembly can further comprise a second roller stack forming a dual roller stack assembly as shown in FIG. 2, which illustrates a v-shape or v-configured roller stack configuration—see top plan view of FIG. 3. The roller stack assembly can also comprise a third and fourth roller stack forming a quad roller stack assembly as shown in FIG. 8, which illustrates a cross configuration—see top plan view of FIG. 7. The roller stack assembly can comprise an extension member as shown in FIG. 7 having shock absorbing spring loaded piston member, which attaches the roller stack to the roller stack assembly. Optionally, the roller stack assembly pivot can include a spring loaded mechanism adapted to resist pivotal rotation of the roller stack assembly about said roller stack assembly pivot.

As shown in FIG. 8 an arm member can be pivotally attached on one end to a support member by a pivot mount and extending from the pivot mount to a distal end. A bracket can be pivotally mounted to said distal end of said arm member and can extend from said distal end to a central axle of a roller stack assembly. A plurality of rollers can be rotatably mounted about a substantially vertical oriented roller axle and retained thereon and vertically stacked one atop another forming a roller stack. An extension member can be pivotally attached to said central axle and can extend from said central axle to said roller stack thereby forming a roller stack assembly. An actuation cylinder having an actuation shaft attached to said distal end of said support arm, where said actuation cylinder actuates the actuation shaft to extend out and retract causing the roller stack assembly to extend toward an engagement position and retract from said engagement position to a disengagement position thereby progressively engaging and disengaging the roller stack assembly with a hide.

The invention includes a method for removing excess water from an animal hide comprising the steps of pressing a plurality of rollers rotatably mounted about a substantially vertical oriented roller axle and vertically stacked one atop another forming a roller stack, against a wet hide of an animal thereby making contact between at least a portion of the plurality of rollers and the wet hide. The roller stack can be retained from above and below on said roller axle between an upper and lower retention member respectively thereby forming a roller stack assembly. The method can include maintaining contact between the at least a portion of the plurality of rollers and the wet hide while conveying the hide along a path of conveyance thereby pressing and wicking liquid from the wet hide. This can be accomplished by the use of an actuator that is selectively controlled by a controller. The method can also include the step of blowing air on the hide to assist the drying process.

Figure 4:
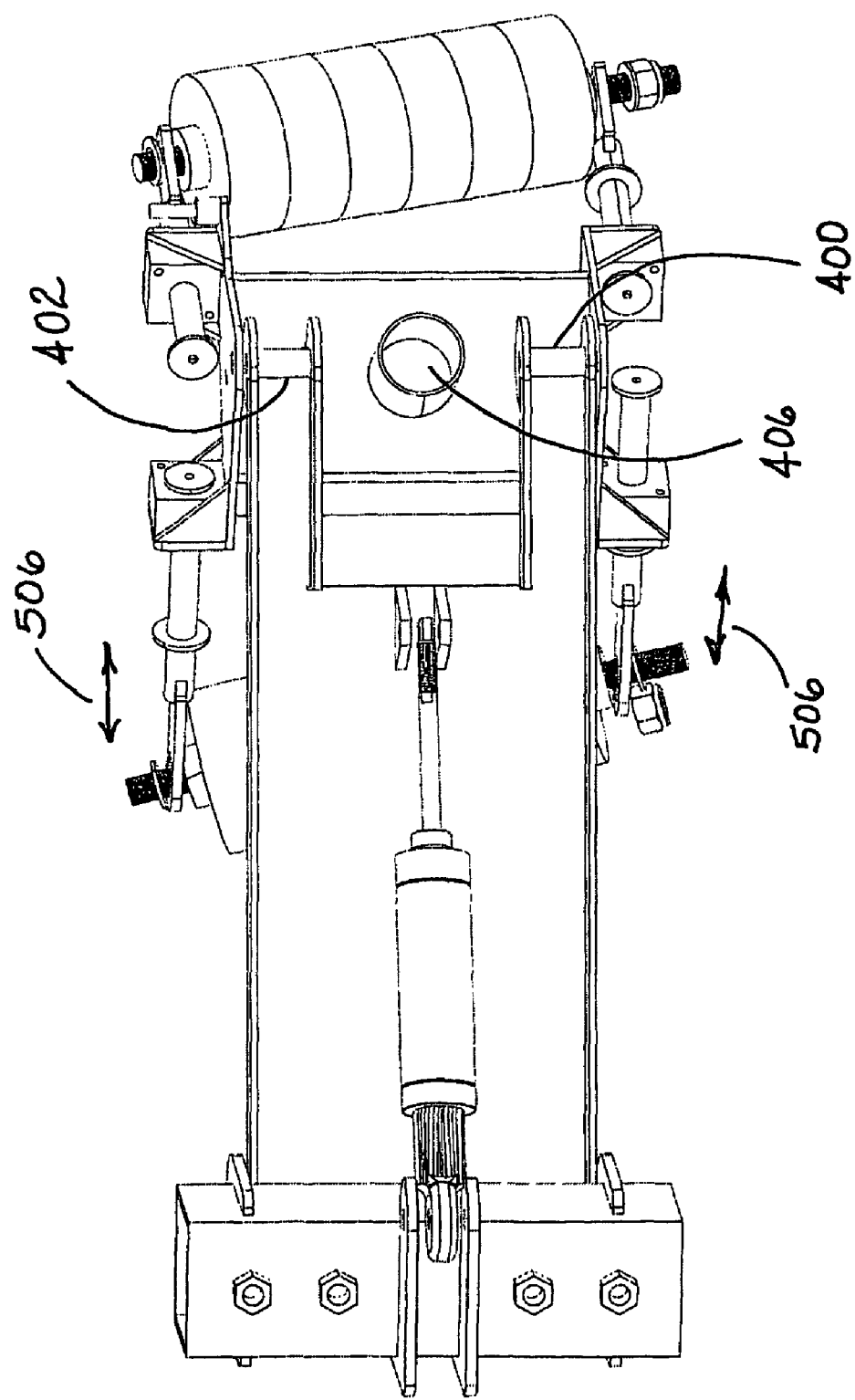
FIG. 4 is an illustrative rear view of a two roller stack configuration.

As shown in FIGS. 2 and 8 the substantially vertical roller axle can be off vertical by about approximately 10 degrees off vertical—plus or minus 5 degrees off vertical. Also as illustrated in FIGS. 3, 4 and 5 the method can include the step of blowing air on the roller stack. Also as shown in FIG. 2, the method can include the step of pressing a second plurality of rollers rotatably mounted about a substantially vertical oriented second roller axle and vertically stacked one atop another forming a second roller stack, against the wet hide of an animal thereby making contact between at least a portion of the second plurality of rollers and the wet hide The details of the invention and various embodiments can be better understood by referring to the figures of the drawing. Referring to FIG. 1, an illustrative perspective view of the two roller stack assembly configuration is provided. The water removal assembly 100 can be positioned adjacent a line of conveyance 103 for animal carcasses. Multiple water removal assemblies can be spaced along the conveyance line and positioned proximate to the line of conveyance such that the hides of the animals can be engaged to remove any excess water. The assembly support member 102 can be mounted to be stationery by an assembly mounting plate 114. A support arm 104 can be pivotally attached to the assembly support member 102. The assembly support arm 104 can pivot in order to engage the hide of the animal. Attached to the support arm 104 is the dual roller stack assembly 106.

The dual roller stack assembly 106 can be pivotally attached to the support arm 104. The dual roller stack assembly can include an upper dual extension retention bracket 108 and a lower dual extension retention bracket 109. The retention brackets 108 and 109 can include extension members extending outward and retaining the roller stacks. The roller stacks 112 and 113 can be mounted between the retention brackets or between the extension members. The roller stacks can include a plurality of rollers stacked one atop another and rotatively mounted on a spool or axle and retained by the upper and lower extensions of the upper and lower retention brackets. The roller stacks 112 and 113 can be stacked on the roller stack spools (axles) 120 and 122, respectively.

The roller stack assembly can be pivotally mounted on a pivot member 110 and can be retained by a roller stack assembly pivot bolt. Therefore, the support arm 104 can pivot back and forth in order to engage the hide of the animal. Further, the arm 104 and the roller stack assembly can pivot back and forth in order to follow the contours of the hide. Further, the dual roller stack assembly can pivot in order to further follow the contours of the hide. The dual roller stack assembly 106 can also include a left vent 116 and a right vent 118 mounted between the retention plates. These vents or ducts can be utilized to direct blown air onto the hide to further the water removal process. The vents can also be utilized to blow or shed water from the roller stacks. The spaces between the individual rollers can act to wick water away from the hide and the blowers can further facilitate removing water from the hide as well as the rollers. The support arm 104 can be rotatively mounted on a pivot and retained by the support arm pivot bolt 105. The pivot assembly is attached to the assembly support member 102. The support arm 104 can be induced to pivot back and forth by an actuation cylinder that is mounted to the assembly support member 102 by the cylinder mounting bracket 124.

Referring to FIG. 2, an illustrative front plan view of the two roller stack water removal assembly configuration is provided. This illustration provides further insight into the operation of the assembly. The roller stacks 112 and 113 can be urged toward the hide of an animal to engage the hide of the animal in order to force water from the hide. The pressing action of the rollers causes water to be pressed and squeezed from the hide of the animal. The spacing between the rollers assists in wicking water away from the hide of the animal. As discussed above, an alternative embodiment can include vents 116 and 118 can optionally provide forced air to further the drying process of the hide and further it to remove and dry water from the rollers.

The roller stacks 112 and 113 can be mounted on spools (axles) 120 and 122 between the retention brackets or the retention bracket extensions. The spools can alternative be referred to as axles. The pivoting back and forth of the support arm 104 is induced by an actuation cylinder that pivots the support arm 104 about the support arm pivot 105, which is mounted to the support member by the support arm pivot mount 200. The actuation cylinder is mounted to the support member 102 by the actuation cylinder mounting bracket 124 and cylinder pivot mount 202. Item 202 shown in FIG. 2 is the actuation cylinder pivot mount on the assembly support member side of the actuation cylinder. The actuation cylinder can be operably designed to be controllable and can utilized to selectively keep a continuous pressure of the roller stacks against a wet hide as it is being conveyed along a path of conveyance adjacent the assembly. The actuator can also be controlled to vary the pressure between the roller stacks and a wet hide.

The roller stacks can be angled off vertical as indicated by angles 204 and 206 so that the roller stacks can better follow the contour of the animal hide. The angles can vary depending on the application and the roller stacks can be designed to be adjustable so that the angle can be varied to achieve optimal performance.

Referring to FIG. 3, an illustrative top plan view of the two roller stack assembly configuration is provided. This top view provides a quick illustration of the actuation cylinder 300 and its operation to pivot the support arm 104 back and forth and further illustrates the pivoting action of the dual roller stack assembly. The support arm 104 can have a support arm line rotation as indicated by arc 310. The support arm 104 can be induced along this range line of rotation by the actuation cylinder 300. The actuation cylinder 300 can actuate the cylinder shaft 304 in and out in order to pivot the support arm along the line of rotation 310. The cylinder shaft 304 can be pivotally mounted to the support arm 104 by a cylinder shaft pivot 306. The opposing end of the actuation cylinder can be pivotally mounted to the cylinder mounting bracket 124 by the actuation cylinder pivot mount 202. The mounting bracket 124 is in turn mounted to the assembly support member 102.

Therefore, when the actuation cylinder actuates the cylinder shaft in and out, the support arm 104 pivots about a pivot member along the line of rotation as indicated by the arc labeled 310. The dual roller stack assembly 106 is pivotally mounted to the support arm and has a pivoting range of rotation as indicated by the roller stack assembly rotation arc 312. This top view shows the assembly with the top retention bracket 108 and the vent assembly 308 is generally located as shown between the retention brackets which can be utilized to channel air onto the hide as well as on the roller stacks. The upper extension members 314 and 316 are also shown.

Referring to FIG. 4, an illustrative rear view of the two roller stack configuration is shown. This rear view provides a further illustration of the dual roller stack assembly 106. The roller stack assembly pivots 400 and 402 are shown. The dual roller stack assembly 106 pivots about the roller stack assembly pivots 400 and 402. This rear view also illustrates a rear duct 406 where a forced air hose can be attached to force air through the vents 116 and 118. This rear view also further illustrates the actuation cylinder interface with the support arm 104.

Referring to FIG. 5, an illustrative bottom view of the two roller stack configuration is shown. This view provides a further illustration of the detailed configuration of the dual roller stack assembly 106. As indicated previously, the vent assembly 308 can have vents 116 and 118 for directing air toward the hide and/or toward the rollers. In this particular configuration the air flow 500 and 502 are shown directed toward the hide of the animal. However, the vents can also be made or configured to be directed toward the roller stacks. The rear duct is also further illustrated which provides a connection point for attached forced air.

The pivotal rotation of the support arm is further illustrated by the arc 510. The pivotal rotation of the roller stack assembly is further illustrated by arc 504. The roller stack can also reciprocate as indicated by directional arrow 506. The pivoting mechanism for allowing the roller stack assembly to pivot as indicated by arc 504 can be spring loaded to resist either direction of rotation such that a pressure can be maintained against the hide. The roller stack reciprocation mechanism for reciprocation along direction 506 can also be outwardly spring loaded to resist inward retraction, again to maintain pressure against the hide. Each of these spring loaded mechanisms can be adjustable to vary the loading.

Figure 6:
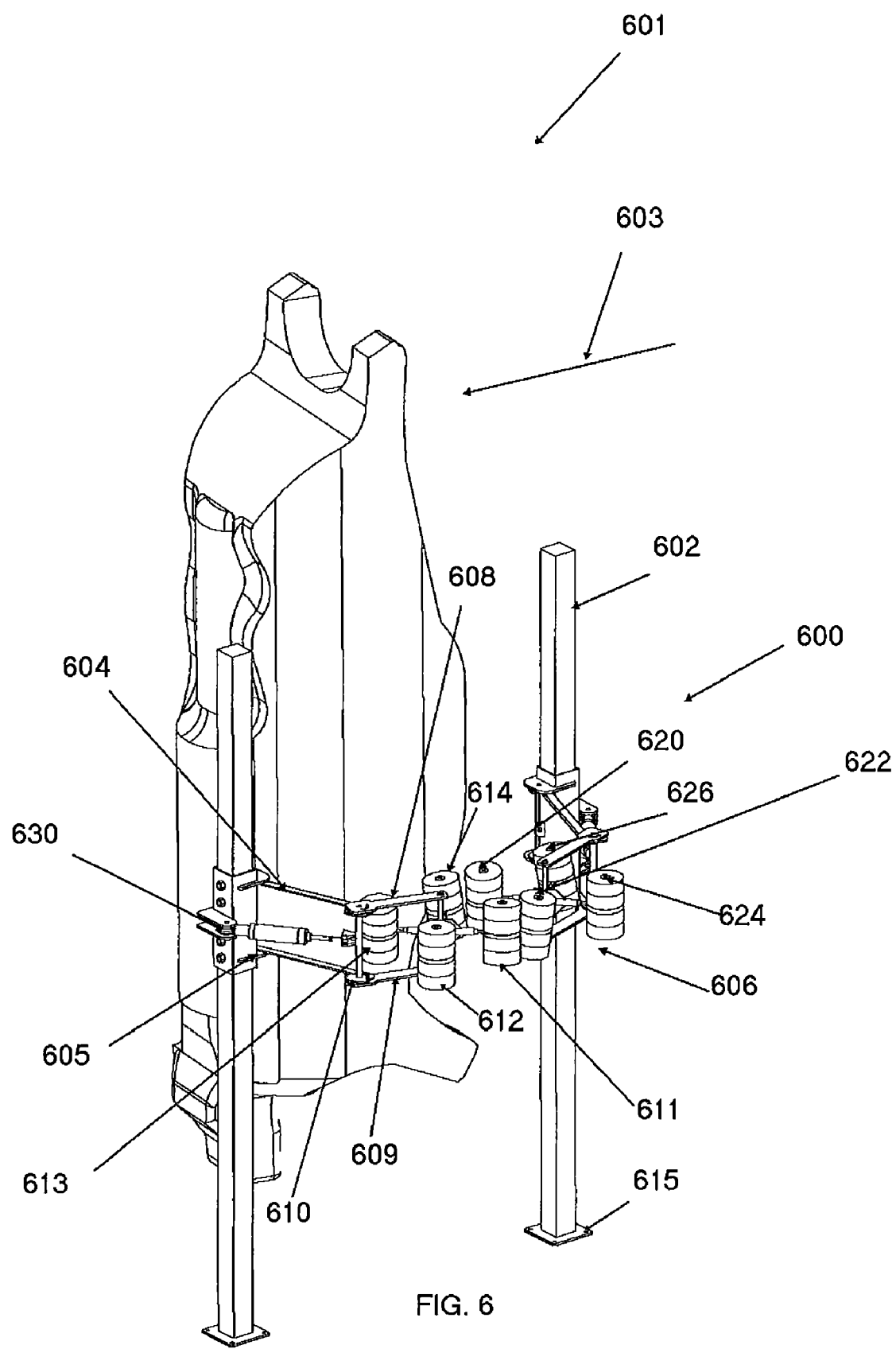
FIG. 6 is an illustrative perspective view of an alternative embodiment four roller stack water removal assembly configuration adjacent a line of conveyance.

Referring to FIG. 6, an illustrative perspective view of an alternative embodiment four roller stack water removal assembly configuration adjacent a line of conveyance is shown. The water removal assembly 600 can be positioned adjacent a line of conveyance 603 for animal carcasses. Multiple water removal assemblies can be spaced along the conveyance line and positioned proximate to the line of conveyance such that the hides of the animals can be engaged to remove any excess water. The assembly support member 602 can be mounted by an assembly mounting plate 615. A support arm 604 can be pivotally attached to the assembly support member 602. The assembly support arm 604 can pivot in order to engage the hide of the animal. Attached to the support arm 604 is the quad roller stack assembly 606.

The quad roller stack assembly 606 can be pivotally attached to the support arm 604 by roller stack assembly pivot 610. The quad roller stack assembly can include an upper extension retention bracket 608 and a lower extension retention bracket 609. The roller stacks can include a plurality of rollers stacked one atop another and rotatively mounted on a spool 620, 622, 624, 626 and retained by the upper and lower extensions of the upper and lower retention brackets. The roller stacks 612 and 613 can be stacked on the roller stack spools or axles.

The roller stack assembly can have a quad pivot member 638 and can be retained by a roller stack assembly pivot bolt 640 and the upper and lower extension retention brackets 608 and 609. Therefore, the support arm 604 can pivot back and forth about pivot 642 in order to engage the hide of the animal. Further, the arm 604 can pivot back and forth in order to follow the contours of the hide. Further, the quad roller stack assembly can pivot about pivot 610 in order to further follow the contours of the hide.

The spaces between the individual rollers can act to wick water away from the hide and blowers can further facilitate removing water from the hide as well as the rollers. The support arm 604 is rotatably mounted on a pivot and retained by the support arm pivot bolt. The pivot assembly is attached to the assembly support member 602. The support arm 604 can be induced to pivot back and forth by an actuation cylinder that is mounted to the assembly support member 602 by the cylinder mounting bracket 630.

Figure 6A:
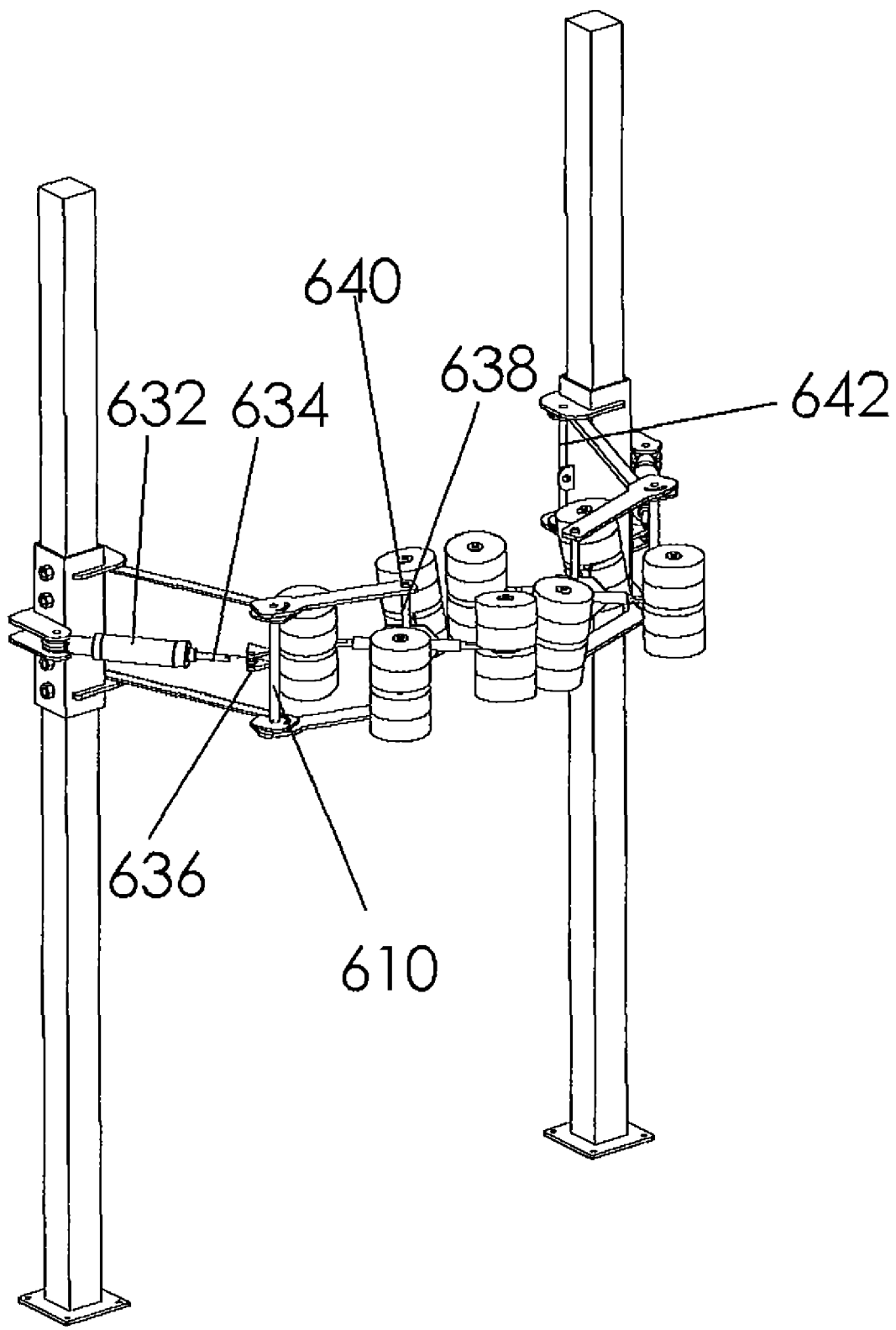
FIG. 6A is an illustrative perspective view of an alternative embodiment four roller stack water removal assembly configuration.

Referring to FIG. 6A, an illustrative perspective view of an alternative embodiment four roller stack water removal assembly configuration is shown. The actuation cylinder 632 is more clearly shown and the cylinder shaft 634 and the cylinder shaft pivot mount 636. Each of the four roller stacks of the quad roller stack assembly are mounted by way of an extension member to a central quad roller pivot 640. The pivot mechanism for pivot 610 and pivot 640 can be spring loaded to resist rotation about the pivot in order to apply pressure against the hide.

Figure 7A:
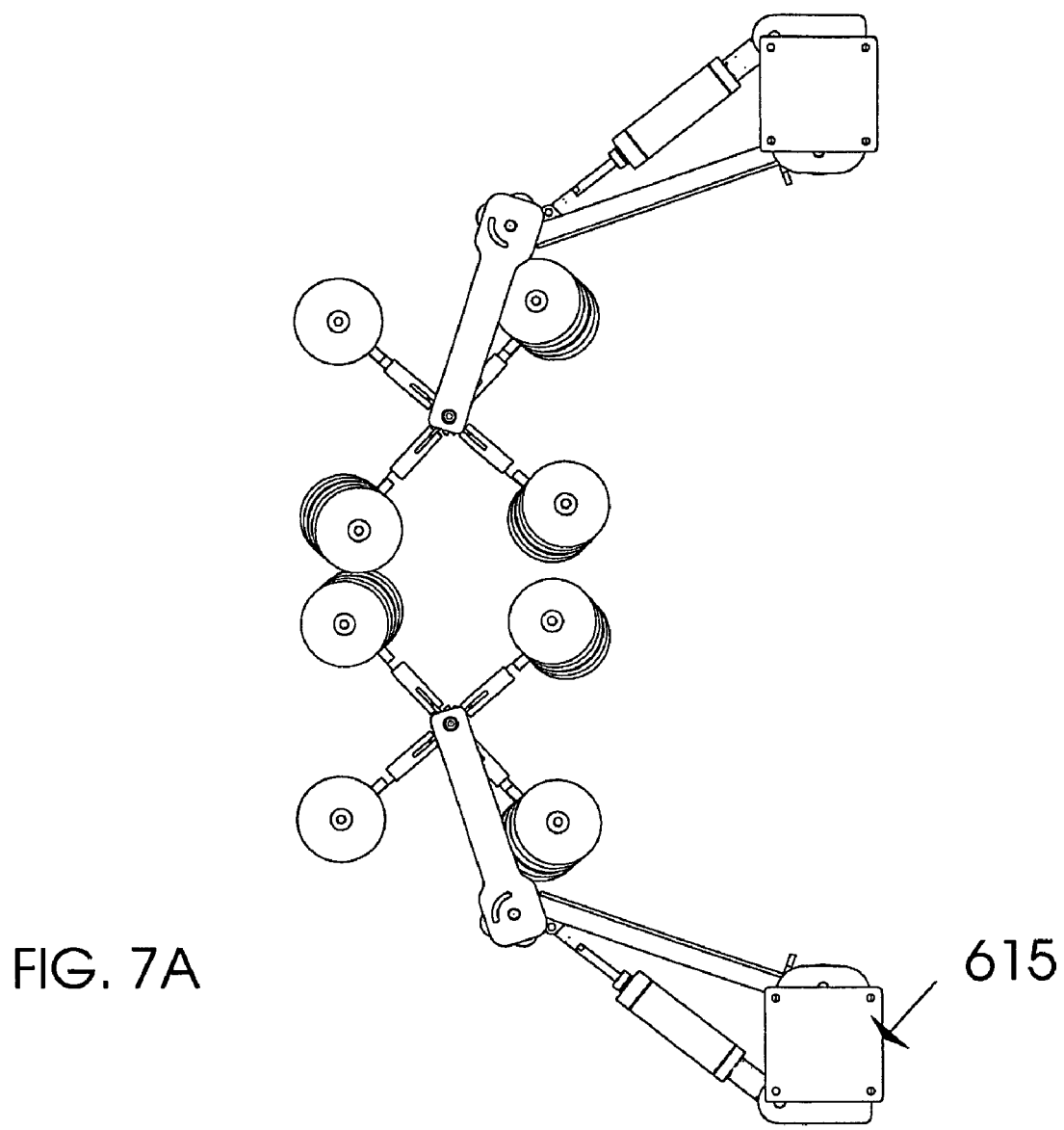
FIG. 7A is an illustrative bottom plan view of an alternative embodiment four roller stack water removal assembly.

Referring to FIG. 7, an illustrative top plan view of an alternative embodiment four roller stack water removal assembly is shown. The direction of rotation of the quad roller stack is indicated by 700. Each of the four roller stacks can be mounted on an extension member 710. The extension member can be design to reciprocably compress and extend its length as indicated by 702. The extension member can be a spring loaded actuation member. This extension member can also assist in applying pressure to the hide with the roller stacks. The direction of rotation of the retention bracket is indicated by 704. The position of the support arm is controlled by the extension of the cylinder shaft as indicated by 705. The support arms direction of rotation is indicated by 708. Referring to FIG. 7A, an illustrative bottom plan view of an alternative embodiment four roller stack water removal assembly is shown.

Figure 9:
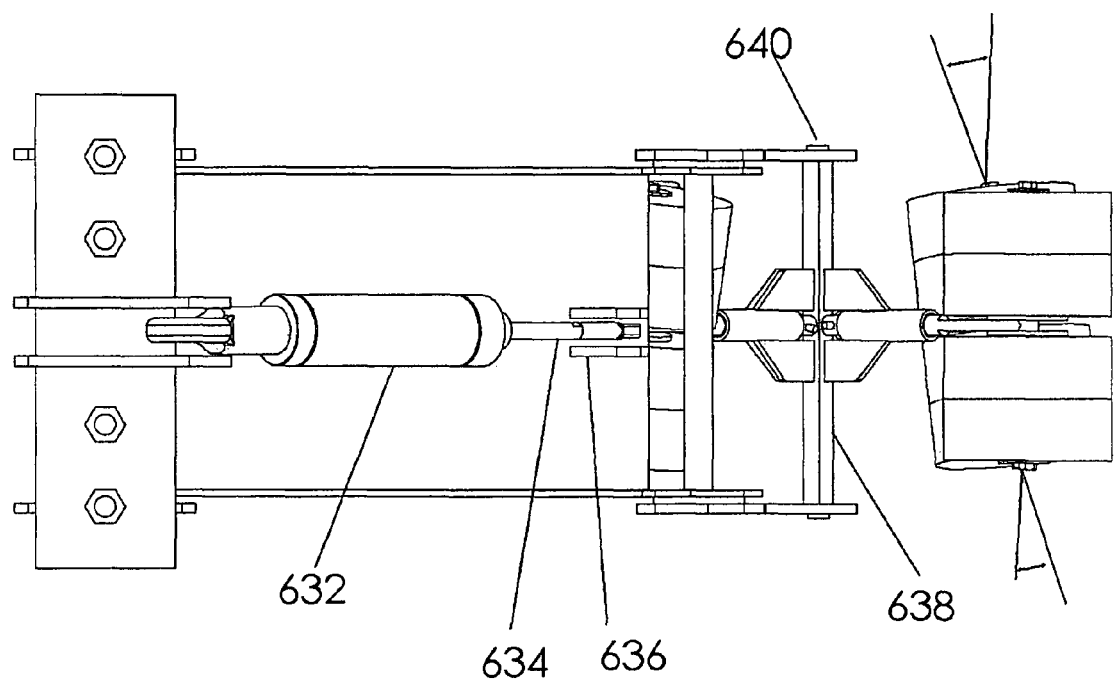
FIG. 9 is an illustration of a rear plan view of an alternative embodiment four roller stack assembly.
Figure 10:
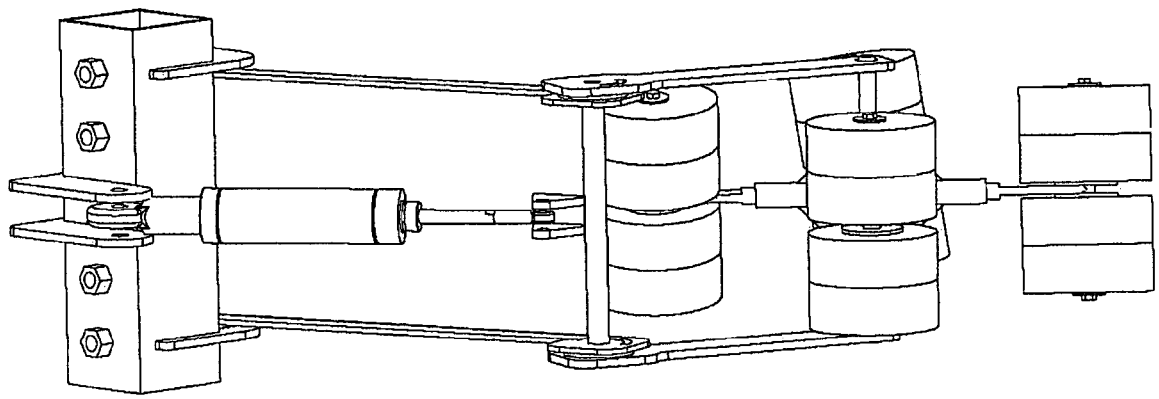
FIG. 10 is an illustration of a rear perspective view of an alternative embodiment four roller stack assembly.

Referring to FIG. 8, an illustration of a front plan view of an alternative embodiment four roller stack assembly is shown. The angles off vertical are illustrated by 800, 802, 804 and 806. The roller stacks can be designed such that the roller stacks are adjustable to adjust the angle off vertical. Referring to FIG. 9, an illustration of a rear plan view of an alternative embodiment four roller stack assembly is shown. The actuation cylinder is more clearly shown. Referring to FIG. 10, an illustration of a rear perspective view of an alternative embodiment four roller stack assembly is shown.

Figure 11:
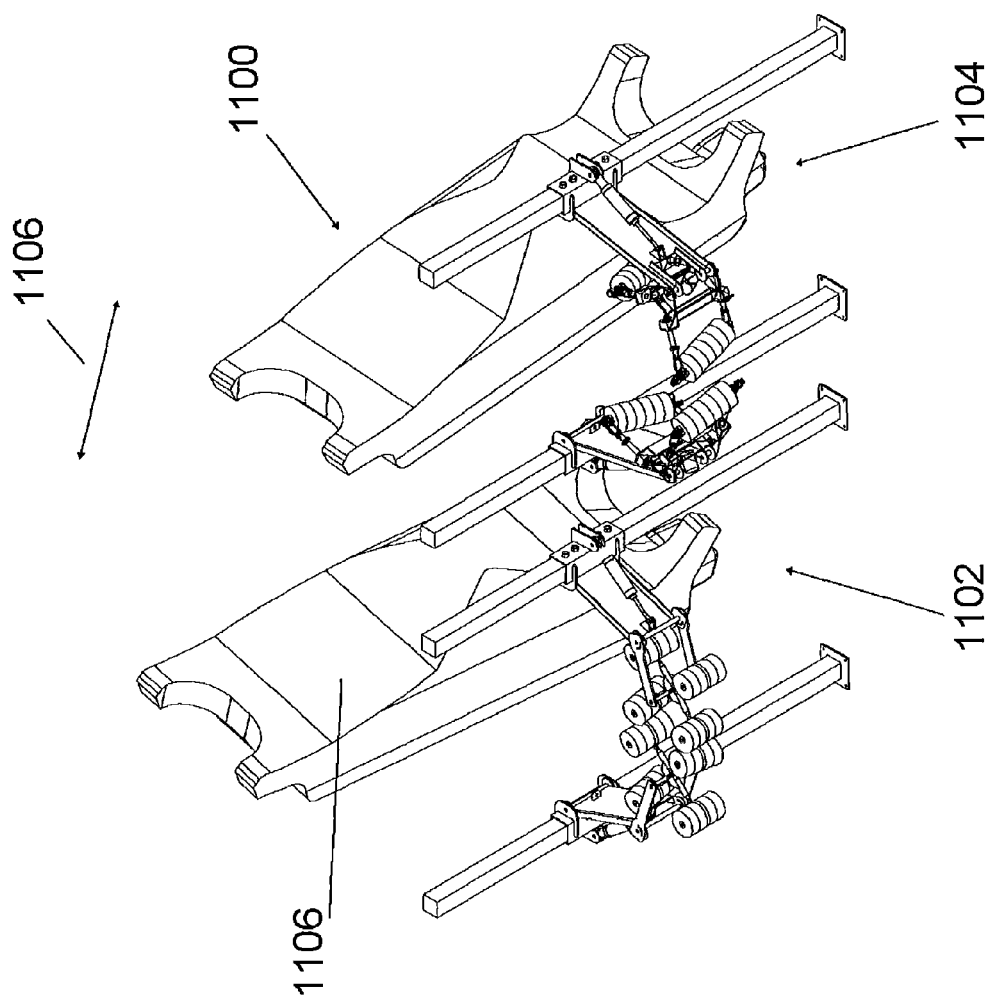
FIG. 11 is an illustrative perspective view of a two roller stack and four roller stack assembly water removal assembly configuration adjacent a line of conveyance.
Figure 12:
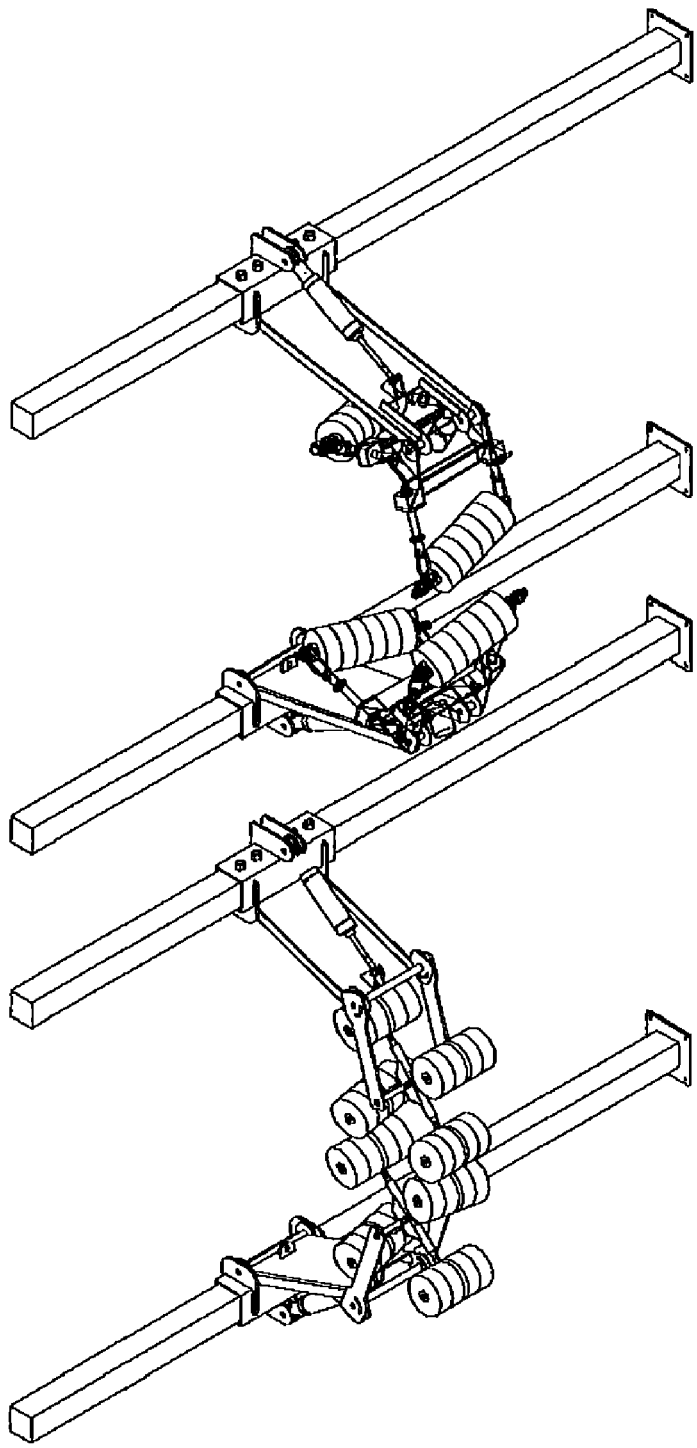
FIG. 12 is an illustrative perspective view of a two roller stack and four roller stack assembly water removal assembly configuration.

Referring to FIG. 11, an illustrative perspective view of a combination two roller stack and four roller stack assembly water removal assembly 1102 and 1104 configuration adjacent a line of conveyance 1106 is shown. The animals 1106 and 1100 are illustrated as being conveyed down the line of conveyance. The remaining figures merely illustrate the combination of the dual and the quad configurations. Referring to FIG. 12, an illustrative perspective view of a two roller stack and four roller stack assembly water removal assembly configuration is shown. Referring to FIG. 13, an illustrative rear plan view of a two roller stack and four roller stack water removal assembly is shown. Referring to FIG. 14, an illustrative top plan view of a two roller stack and four roller stack water removal assembly is shown.

One or more of the dual and/or quad stack assemblies can be utilized in line and adjacent a path of conveyance along which an animal carcass is conveyed. Single or multiple stack assemblies can also be utilized individually or in combination and in line one with respect to the other. Use of two or more of the assemblies in combination can serve the purpose of addressing all contours and recesses of the hide.

The various animal hide de-watering examples shown above illustrate a novel method and apparatus for removing excess water from the hide of an animal during the slaughtering process. A user of the present invention may choose any of the above animal hide de-watering embodiment, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An apparatus for removing excess water from an animal hide comprising:
   an upper retention bracket having an upper prong extending there from and a lower retention bracket having a lower prong extending there from where said upper prong and said lower prong retain above and below respectively a plurality of rollers rotatably mounted about a proximately vertical oriented roller axle where said rollers are vertically stacked one atop another forming a roller stack assembly where said roller stack assembly is pivotally mounted to a support aim, where said support arm has an actuation cylinder attached thereto and operable actuate to rotate said arm back and forth to an engage position and a disengage position to engage and disengage said roller stack assembly.

2. The apparatus for removing excess water as recited in claim 1, where said roller stack assembly further comprises a second upper and lower prong extending there from and a corresponding second roller stack thereby forming a dual roller stack assembly.

3. The apparatus for removing excess water as recited in claim 2, where said roller stack assembly further comprises a third and fourth upper and lower prong extending there from and corresponding a corresponding third and fourth roller stack forming a quad roller stack assembly.

4. The apparatus for removing excess water as recited in claim 1, where each of said upper and lower prongs further comprise shock absorbing spring loaded piston members, which attaches the roller stack to the roller stack assembly.

5. The apparatus for removing excess water as recited in claim 4, where said pivotal mount between the support arm and the roller stack assembly includes a spring loaded mechanism adapted to resist pivotal rotation of the roller stack assembly.

6. An apparatus for removing excess water from an animal hide comprising:
   a plurality of rollers rotatably mounted about a proximately vertical oriented roller axle and vertically stacked one atop another forming a roller stack;
   said roller stack retained from above and below on said roller axle between an upper and lower retention bracket respectively forming a roller stack assembly;
   said upper and lower retention brackets pivotally mounted on a common roller stack assembly pivot about which the roller stack assembly rotates;
   said roller stack assembly pivot mounted on an engaging end of a substantially horizontally extending support aim where a distal end of said support arm is pivotally mounted on a support arm pivot about which the support arm rotates and where said support arm pivot is mounted to a support member; and
   an actuation cylinder having an actuation shaft attached to said support arm where said actuation cylinder actuates the actuation shaft to extend out and retract causing the pivot arm to rotate to an engaging position and a disengaging position.

7. The apparatus for removing excess water as recited in claim 6, where said roller stack assembly further comprises a second roller stack forming a dual roller stack assembly.

8. The apparatus for removing excess water as recited in claim 7, where said roller stack assembly further comprises a third and fourth roller stack forming a quad roller stack assembly.

9. The apparatus for removing excess water as recited in claim 6, where said roller stack assembly further comprises a shock absorbing spring loaded piston member, which attaches the roller stack to the roller stack assembly.

10. The apparatus for removing excess water as recited in claim 9, where said roller stack assembly pivot includes a spring loaded mechanism adapted to resist pivotal rotation of the roller stack assembly about said roller stack assembly pivot.

11. An apparatus for removing excess water from an animal hide comprising:
   an arm member pivotally attached on one end to a support member by a pivot mount and extending from the pivot mount to a distal end;
   a bracket pivotally mounted to said distal end of said arm member and extending from said distal end of said arm member to a central axle mounted to said bracket;
   a plurality of rollers rotatably mounted about a substantially vertical oriented roller axle and retained thereon and vertically stacked one atop another forming a roller stack and an extension member pivotally attached to said central axle and extending from said central axle to said roller and attached thereto thereby forming a roller stack assembly;
   an actuation cylinder having an actuation shaft attached to said distal end of said arm member, where said actuation cylinder actuates the actuation shaft to extend out and retract causing the roller stack assembly to extend toward an engagement position and retract from said engagement position to a disengagement position thereby progressively engaging and disengaging the roller stack assembly with a hide.

12. The apparatus for removing excess water as recited in claim 11, where said extension member includes a spring loaded piston mechanism adapted to progressively reciprocate to extend said roller stack away from and retract toward said central axle responsive to force applied to the roller stack.

13. The apparatus for removing excess water as recited in claim 12, where said central axle has a spring loaded pivot mechanism adapted to resist pivotal rotation of the extension member about the central axle.

14. The apparatus for removing excess water as recited in claim 12, where the distal end of said arm has a spring loaded pivot mechanism adapted to resist pivotal rotation of the bracket.

15. The apparatus for removing excess water as recited in claim 11, where the orientation of the roller axle is proximately 10 degrees off vertical.

16. An apparatus for removing excess water from an animal hide comprising:
   a plurality of rollers rotatably mounted about a substantially vertical oriented roller axle and vertically stacked one atop another forming a roller stack and said roller stack retained on said roller axle by a retention means forming a roller stack assembly;
   an actuation means mounted to a support member and having an actuator member extending from the actuation means and attached to said roller stack assembly where said actuation means is adapted to actuate the actuator member to progressively reciprocate toward and away from said actuation means causing the roller stack assembly to transition toward an engagement position and retract from said engagement position thereby progressively engaging and disengaging the roller stack assembly with a hide.

17. The apparatus for removing excess water as recited in claim 16, further comprising an air duct attached to said roller stack assembly and oriented to direct air flowing there through toward the roller stack; and
   a blower attached to said air duct and adapted to blow air through said duct toward the roller stack.

18. The apparatus for removing excess water as recited in claim 16, further comprising:
   a second plurality of rollers rotatably mounted about a substantially vertical oriented second roller axle and vertically stacked one atop another forming a second roller stack and said second roller stack retained on said roller axle by a second retention means.

19. The apparatus for removing excess water as recited in claim 18, further comprising:
   a third and fourth plurality of rollers rotatably mounted about a substantially vertical oriented third and fourth roller axle and vertically stacked one atop another forming a third and fourth roller stack and said third and fourth roller stack retained on said third and fourth roller axle by a second retention means.

20. A method for removing excess water from an animal hide comprising the steps of:
   pressing a plurality of rollers rotatably mounted about a substantially vertical oriented roller axle and vertically stacked one atop another forming a roller stack against a wet hide of an animal thereby making contact between at least a portion of the plurality of rollers and the wet hide;
   retaining said roller stack from above and below on said roller axle between an upper and lower retention member respectively forming a roller stack assembly; and
   maintaining contact between the at least a portion of the plurality of rollers and the wet hide while conveying the hide along a path of conveyance thereby pressing and wicking liquid from the wet hide.

21. The method for removing excess water as recited in claim 20, where the substantially vertical roller axle is 10 degrees off vertical.

22. The method for removing excess water as recited in claim 21, further comprising the step of blowing air on the roller stack.

23. The method for removing excess water as recited in claim 20, further comprising the step of:
   pressing a second plurality of rollers rotatably mounted about a substantially vertical oriented second roller axle and vertically stacked one atop another forming a second roller stack against the wet hide of an animal thereby making contact between at least a portion of the second plurality of rollers and the wet hide.

24. The method for removing excess water as recited in claim 23, further comprising the step of:
   pressing a third and fourth plurality of rollers rotatably mounted respectively about a substantially vertical oriented third and fourth roller axle and vertically stacked one atop another forming a third and fourth roller stack, against the wet hide of an animal thereby making contact between at least a portion of the third and fourth plurality of rollers and the wet hide.

* * * * *